(12) United States Patent
Nishi et al.

(10) Patent No.: US 6,655,414 B2
(45) Date of Patent: Dec. 2, 2003

(54) FUEL HOSE

(75) Inventors: Eiichi Nishi, Kanagawa (JP); Masako Nagashima, Kanagawa (JP)

(73) Assignee: Asahi Glass Company, LImited, Tokyo (JP)

( * ) Notice: Subject to any disclaimer, the term of this patent is extended or adjusted under 35 U.S.C. 154(b) by 0 days.

(21) Appl. No.: 10/107,369

(22) Filed: Mar. 28, 2002

(65) Prior Publication Data

US 2002/0104575 A1 Aug. 8, 2002

Related U.S. Application Data

(63) Continuation of application No. PCT/JP00/06723, filed on Sep. 28, 2000.

(30) Foreign Application Priority Data

Sep. 30, 1999 (JP) .............................. 11-277821

(51) Int. Cl.$^7$ ................................. F16L 11/00

(52) U.S. Cl. ........................ 138/137; 138/121; 138/141; 428/36.91

(58) Field of Search ................................. 138/121, 137, 138/141; 428/36.91

(56) References Cited

U.S. PATENT DOCUMENTS

| | | | | |
|---|---|---|---|---|
| 5,284,184 A | * | 2/1994 | Noone et al. | 138/121 |
| 5,305,799 A | * | 4/1994 | Dal Palu | 138/109 |
| 5,560,398 A | * | 10/1996 | Pfleger | 138/121 |
| 5,566,720 A | * | 10/1996 | Cheney et al. | 138/137 |
| 5,588,468 A | * | 12/1996 | Pfleger | 138/121 |
| 5,718,957 A | * | 2/1998 | Yokoe et al. | 428/36.91 |
| 5,736,610 A | * | 4/1998 | Nishi et al. | 525/276 |
| 6,293,312 B1 | * | 9/2001 | Stripe | 138/141 |

FOREIGN PATENT DOCUMENTS

| | | |
|---|---|---|
| JP | 7-18026 | 1/1995 |
| JP | 7-205328 | 8/1995 |
| JP | 8-104806 | 4/1996 |
| JP | 10-259216 | 9/1998 |
| JP | 10-311461 | 11/1998 |

* cited by examiner

Primary Examiner—James Hook
(74) Attorney, Agent, or Firm—Oblon, Spivak, McClelland, Maier & Neustadt, P.C.

(57) ABSTRACT

A fuel hose having a two layer structure comprising an inner layer made of a fluororesin and an outer layer adjacent thereto, made of a thermoplastic resin other than a fluororesin, wherein the fluororesin has a tensile strength at break of higher than 21 MPa, and the fluororesin of the inner layer has a melt adhesiveness with the thermoplastic resin of the outer layer.

18 Claims, 1 Drawing Sheet

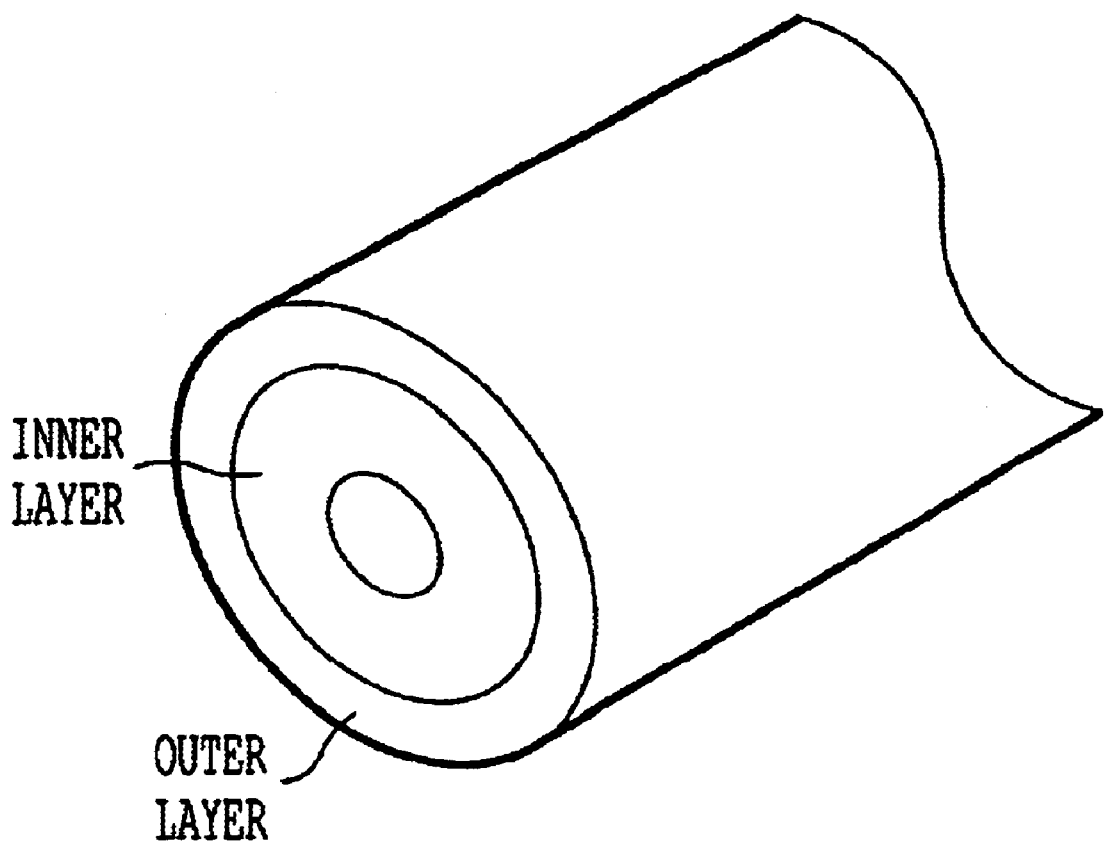

FUEL HOSE

FIELD OF THE INVENTION

The present invention relates to a fuel hose of a two layer structure, which is excellent in interlaminar adhesion and has an antistatic function.

DESCRIPTION OF THE BACKGROUND

Heretofore, a fluororesin is used in a wide range of fields, since it is excellent in e.g. heat resistance, chemical resistance, weather resistance, non-tackiness, low frictional nature and low dielectric property. For example, use as a surface covering material to cover a substrate is known wherein a film or the like of a fluororesin is laminated on the surface of a substrate made of an inorganic material such as a metal or glass or an organic material such as a synthetic resin. Further, as an important application to a laminate, a fuel hose may be mentioned which is used in an engine room of an automobile and which is exposed to a severe condition such as a high temperature environment.

The fuel hose is a hose for piping, wherein a gasoline fuel containing an alcohol or an aromatic compound is transported. In recent years, regulations relating to permeation of gasoline have become severer, and as a measure to cope with such requirements, a hose of a multilayer structure such as a two layer structure, has been proposed, and especially for the inner layer which is directly in contact with the fuel, it is desired to use a resin having chemical resistance against a corrosive material such as ethanol or methanol present in the fuel and a gas barrier property not to let such a material permeate. From such a viewpoint, a fluororesin having heat resistance, chemical resistance and gas barrier property, is considered to be one of the most preferred materials, as the material for the inner layer.

However, the fluororesin forming the inner layer has a high insulation property, whereby static electricity is likely to form and electrification is likely to result when a fuel passes in the hose. Accordingly, leakage of the fuel due to formation of a hole in the hose, and various problems due to electric discharge, are likely to result. Therefore, it is necessary to prevent electrification of the fluororesin, for example, by imparting electrical conductivity to release the formed static electricity.

On the other hand, for the outer layer of a fuel hose, it is common to use a polyamide resin such as polyamide 6, polyamide 11 or polyamide 12, which has relatively good durability.

Heretofore, there has been the following problem when it is attempted to construct a fuel hose having a two layer structure comprising an inner layer made of a fluororesin and an outer layer adjacent thereto, made of e.g. a polyamide. Namely, the fluororesin is, by its nature, a material having a low adhesive property, and even if it is attempted to fuse a tube of a fluororesin directly to the base material of the outer layer, no adequate bond strength is obtainable. Further, even if a bond strength of a certain degree may be obtained, the bond strength is likely to vary depending upon the type of the base material, whereby there has been a problem that the bond strength is practically inadequate.

Under these circumstances, an attempt has been made to make a hose of a three layer structure wherein a layer of an adhesive is interposed between an inner layer of a fluororesin and an outer layer of a polyamide resin.

However, as compared with a fluororesin, such an adhesive is inadequate in chemical resistance, water resistance and heat resistance, and not infrequently, such a portion has been a cause of a problem in the laminated structure employing a fluororesin. Further, from the viewpoint of the production process, in order to use an adhesive, a step of surface treatment of the fluororesin or a step for primer treatment has been required in many cases. Further, a step of laminating an adhesive is required, thus leading to a high cost. Namely, such a fuel hose requires an outer layer, an adhesive layer and an inner layer at the minimum and will be a multilayer hose of at least three layers. Generally, as the number of layers increases, the number of extruders to be used increases, thus leading to a high cost.

Further, a fuel hose is basically subjected to bending at various angles over the entire length of a straight tube produced by extrusion molding, in order to adapt it to configurational or spacial restrictions in a specific structure of each automobile. The bending of the hose not only increases a process step, but wrinkles may thereby be formed. Once wrinkles are formed, the stress will be concentrated at such a portion, whereby there will be a problem that the useful life of the hose tends to be substantially short.

SUMMARY OF THE INVENTION

It is an object of the present invention to provide a fuel hose which has a double layer structure excellent in interlaminar adhesion without using an adhesive and comprising an inner layer made of a fluororesin having an antistatic function and an outer layer adjacent thereto, and which can be mounted on an automobile, preferably without bending.

BRIEF DESCRIPTION OF DRAWING

FIG. 1 shows a cross-sectional view of a two-layer hose.

DETAILED DESCRIPTION OF THE PREFERRED EMBODIMENT

The present invention has been made to solve the above problems, and the present invention provides a fuel hose having a two layer structure comprising an inner layer made of a fluororesin and an outer layer adjacent thereto, made of a thermoplastic resin other than a fluororesin, wherein the fluororesin has a tensile strength at break of higher than 21 MPa, and the fluororesin of the inner layer has a melt adhesiveness with the thermoplastic resin of the outer layer.

Further, the present invention provides the above fuel hose which has a corrugated region at a midpoint thereof.

Now, the present invention will be described in further detail with reference to the preferred embodiments.

The present invention provides a fuel hose having a two layer structure comprising an inner layer made of a fluororesin and an outer layer adjacent thereto, made of a thermoplastic resin other than a fluororesin. As the thermoplastic resin other than a fluororesin to be used as the outer layer, various thermoplastic resins can be used.

It may, for example, be a polyolefin such as polyethylene or polypropylene; a polyamide such as polyamide 6, polyamide 66, polyamide 610, polyamide 612, polyamide 11 or polyamide 12; a polyester such as polyethylene terephthalate or polybutylene terephthalate; a (meth)acrylic resin such as polymethyl acrylate or polymethyl methacrylate; polystyrene, an ABS resin, an AS resin, polyimide, polyamide.imide, polyphenylene sulfide, polyvinyl butyral, polyvinylidene chloride, polyacetal or a vinyl chloride resin. Further, it may be an elastomer such as a polyolefin type thermoplastic elastomer, a polyamide type thermoplastic elastomer, a polyester type thermoplastic elastomer, a polybutadiene type thermoplastic elastomer or a polystyrene type thermoplastic elastomer.

These resins may be used alone or as blended.

Particularly preferred is a polyamide excellent in flexibility and low temperature impact resistance. Especially, polyamide 6, polyamide 11 or polyamide 12 is preferred.

As the fluororesin to be used as an inner layer in the present invention, basically, any known fluororesin may be used. However, an ethylene/tetrafluoroethylene copolymer, polytetrafluoroethylene or a tetrafluoroethylene/hexafluoropropylene copolymer is preferred, and an ethylene/tetrafluoroethylene copolymer (hereinafter referred to as ETFE) is most preferred.

ETFE may preferably be one having tetrafluoroethylene and ethylene copolymerized in a ratio of from 70/30 to 30/70 (molar ratio) or one having such monomers copolymerized with at least another copolymerizable monomer other than ethylene, such as a fluoroolefin or propylene. A more preferred copolymer is one having tetrafluoroethylene/ethylene/other monomer copolymerized in a molar ratio of (60-30)/(20-60)/(0-40), particularly preferably (60-40)/(35-60)/(0-5).

Such a copolymerizable monomer may, for example, be an α-olefin such as propylene or butene; a fluoroolefin having an unsaturated group and hydrogen atoms, such as vinyl fluoride, vinylidene fluoride or (perfluorobutyl) ethylene; a vinyl ether such as an alkyl vinyl ether or a (fluoroalkyl) vinyl ether; or a (meth)acrylate such as a (fluoroalkyl) acrylate or a (fluoroalkyl) methacrylate. Further, a monomer having no hydrogen atoms in an unsaturated group, such as hexafluoropropylene or a perfluoro (alkyl vinyl ether) may be used in combination. As described in the foregoing, in the present invention, ETFE is used to mean an ethylene/tetrafluoroethylene copolymer including a copolymer with such a copolymerizable monomer. ETFE can be produced by various known polymerization methods such as bulk polymerization, suspension polymerization, emulsion polymerization and solution polymerization.

In the present invention, the fluororesin of the inner layer has a feature that it has melt adhesiveness with the thermoplastic resin of the outer layer.

The following may, for example, be mentioned as the fluororesin having such melt adhesiveness.

(1) A fluororesin having adhesive functional groups required for bonding to the outer layer.

(2) ETFE having at least one of the melt flow property wherein the melt flow rate is at least 40, and an infrared absorption property wherein in the infrared absorption spectrum, it has a distinct absorption peak within a range of a wavenumber of from 1720 to 1800 cm$^{-1}$.

A method for introducing adhesive functional groups of (1) may be:

① a method of grafting a compound (hereinafter referred to as a grafting compound) having an adhesiveness-imparting functional group and a connecting group capable of grafting, to the fluororesin (JP-A-7-173230, JP-A-7-173446, JP-A-7-173447, JP-A-10-311461, etc.) and ② a method wherein at the time of polymerization of the fluororesin, at least one of copolymerizable monomers is made to have a functional group.

Here, the adhesiveness-imparting functional group is a group having reactivity or polarity and may, for example, be a carboxyl group, a residue after dehydration condensation of a carboxyl group (a carboxylic anhydride residue), an epoxy group, a hydroxyl group, an isocyanate group, an ester group, an amide group, an acid amide group, an aldehyde group, an amino group, a hydrolyzable silyl group or a cyano group.

① Grafting to the fluororesin may be carried out, for example, in the case of ETFE, by melt mixing ETFE, the grafting compound and a radical-forming agent at a temperature for generation of radicals, to graft the grafting compound to ETFE. Most preferred is a method wherein grafting is carried out while conducting melt kneading in a cylinder of an extrusion molding machine or an injection molding machine. The grafted ETFE may be made into molded material such as pellets. Further, as will be described hereinafter, the grafting in the molding machine such as an extrusion molding machine, is followed by, for example, multilayer extrusion, whereby a molded product such as a multilayer hose can be obtained.

The grafting compound is preferably a compound having (a) a connecting group selected from an organic group having an α,β-unsaturated double bond at a terminal, a peroxy group and an amino group, and (b) at least one adhesiveness-imparting functional group selected from a carboxyl group, a carboxylic anhydride residue, an epoxy group, a hydroxyl group, an isocyanate group, an ester group, an amide group, an acid amide group, an aldehyde group, an amino group, an hydrolyzable silyl group and a cyano group.

Among them, an unsaturated carboxylic acid, an epoxy group-containing unsaturated compound, a hydrolyzable silyl group-containing unsaturated compound or an epoxy group-containing peroxy compound is particularly preferred, and an unsaturated carboxylic anhydride is most preferred. The unsaturated carboxylic anhydride may, for example, be maleic anhydride or fumaric anhydride.

Further, the radical-forming agent is preferably one having a decomposition temperature within a range of from 120 to 350° C. and a half value period of about 1 minute. For example, it may be t-butyl hydroperoxide, benzoyl peroxide, dichlorobenzoyl peroxide, dicumyl peroxide or lauroyl peroxide.

② In the method wherein at the time of polymerization of ETFE, at least one of copolymerizable monomers is made to have a functional group, the following monomers may, for example, be mentioned as the functional group-containing monomer to be used.

(a) A perfluorovinyl ether monomer such as $R^1$ (OCFXCF$_2$)$_m$OCF=CF$_2$ (wherein $R^1$ is a $C_{1-6}$ perfluoroalkyl group, X is a fluorine atom or a trifluoromethyl group, and m is an integer of from 1 to 6);

(b) a perfluorovinyl ether monomer having a group which can easily be converted to a carboxylic acid group or a sulfonic acid group, such as CH$_3$OC(=O) CF$_2$CF$_2$CF$_2$OCF=CF$_2$ or FSO$_2$CF$_2$CF$_2$OCF(CF$_3$) CF$_2$OCF=CF$_2$;

(c) a vinyl ester monomer such as vinyl acetate;

(d) a vinyl ether monomer such as ethyl vinyl ether, cyclohexyl vinyl ether or hydroxybutyl vinyl ether; and (e) an allyl ether monomer such as methyl allyl ether.

These monomers may be used alone or in combination as a mixture of two or more of them. A functional group may further be provided by a free radical.

Further, as a polymerization initiator, a compound containing a functional group may be employed. Further, the polymerized fluororesin may be subjected to post treatment such as heat treatment, treatment with free radicals, acidic treatment or basic treatment, to provide new functional groups.

(2) Further, the fluororesin having melt adhesiveness (in a state not containing a filler, etc.) may be ETFE having a melt flow characteristic such that the melt flow rate (hereinafter referred to as MFR) is at least 40, and/or ETFE having an infrared absorption characteristic such that in the infrared absorption spectrum, it has a distinct absorption peak within a range of wavenumber of from 1720 to 1800 $cm^{-1}$.

In the present invention, MFR is a value measured by the method stipulated in ASTM D-3159. Namely, it is represented by the amount of molten ETFE passed through a nozzle having a diameter of 2 mm and a length of 10 mm in 10 minutes at 297° C. and 49 N (g/10 min).

MFR is an index of the melt flow characteristics of the resin and is also an index of the molecular weight. Usually, MFR (g/10 min) of ETFE obtained by polymerization is less than 40, and the adhesive strength is low. Whereas one having a MFR of at least 40 and a high melt flow characteristics, has a large adhesive strength. Preferably, MFR is at least 50, more preferably at least 60. The upper limit may be substantially infinite (liquid at a temperature of 297° C.).

On the other hand, the distinct infrared absorption peak within a range of wavenumber of from 1720 to 1800 $cm^{-1}$ is considered to be derived from a functional group formed by a reaction of an oxygen molecule with a double bond formed anew on the molecular chain by a reaction of withdrawing a hydrogen atom, a fluorine atom or the like from ETFE. By the formation of such a functional group, the melt adhesiveness will be remarkably improved, and a high adhesive strength will be provided also against a material, to which the adhesive strength used to be inadequate, or against a material, to which the boding used to be impossible. This is evident from the fact that ETFE having low adhesiveness obtained by a usual polymerization method does not have such an absorption peak.

Particularly, ETFE having a distinct absorption peak at 1759 $cm^{-1}$ or 1788 $cm^{-1}$ is especially preferred, since the adhesive strength with other materials will be remarkably increased.

Here, "in the infrared absorption spectrum, it has a distinct absorption peak within a range of wavenumber of from 1720 to 1800 $cm^{-1}$" means that when a film sample of ETFE having a thickness of 100 μm is subjected to an infrared absorption spectrum measurement, an absorption peak of absorbance of at least 0.002 is present in the range of wavenumber of from 1720 to 1800 $cm^{-1}$.

More preferably, (3) ETFE having a melt flow characteristic such that the melt flow rate is at least 40 and an infrared absorption characteristic such that in the infrared absorption spectrum, it has a distinct absorption peak within a range of wavenumber of from 1720 to 1800 $cm^{-1}$, is most desirable, since it has a particularly high melt adhesiveness.

ETFE having such a melt flow characteristic of MFR being at least 40 or an infrared absorption spectrum characteristic, can be obtained by subjecting ETFE obtained by a usual polymerization method (one having a MFR of less than 40) to ① irradiation with e.g. high energy rays, ② heat treatment at a temperature of at least 300° C., preferably from 330 to 400° C. for from 5 to 30 minutes, or ③ melt kneading with a peroxide at a temperature higher than its decomposition temperature to induce breakage of molecular chains by free radicals generated from the peroxide and thereby to reduce the molecular weight (JP-A-11-320770).

It is also possible to obtain ETFE having a MFR of at least 40 by adjusting the type or the amount of the chain transfer agent during the polymerization of ETFE to obtain a polymer having a molecular weight lower than usual ETFE. However, ETFE having a MFR of at least 40, obtained by such selection of the polymerization conditions, does not have the above-mentioned infrared absorption characteristic.

The inner layer in the present invention has electrical conductivity, and it is preferably one having a volume resistivity of from 1 to $10^9$ (Ω·cm), so that the antistatic function will be effectively obtained.

The electrical conductivity may be imparted by incorporating an electrical conductivity-imparting filler to the inner layer. The electrical conductivity-imparting filler may, for example, be a powder of metal such as copper, nickel or silver; a fiber of metal such as iron or stainless steel; carbon black, or a metal inorganic compound having the surface of e.g. zinc oxide, glass beads or titanium oxide coated by metal sputtering or electroless plating. Among them, carbon black is most preferred, since hydroxyl groups or carboxyl groups are present on the particle surface, and such groups also serve as adhesive groups to improve the adhesiveness of the inner layer.

The blending amount of the electrical conductivity-imparting filler may suitably be determined depending upon the type of the filler, the type of the fluororesin, the designed conductive performance of the hose, the molding conditions, etc., but it is usually from 1 to 30 parts by mass, particularly from 5 to 20 parts by mass, per 100 parts by mass of the fluororesin.

To the thermoplastic resin layer other than a fluororesin, constituting the outer layer, and the conductive fluororesin layer constituting the inner layer, of the fuel hose of the present invention, a filler such as silica, carbon, glass fiber or carbon fiber, or an optional component such as a pigment, a plasticizer, an adhesion-imparting agent, a silane coupling agent, a titanate coupling gent, a flame retardant or a photostabilizer, may be incorporated in a range not to impair the respective performance. Further, to ETFE, other resins may be blended, so long as the predetermined adhesiveness can be maintained, and usual ETFE may be blended.

Further, it is also preferred to use, as a reinforcing agent for the inner layer, reinforcing fibers such as nylon fibers, polyester fibers, aramide fibers or carbon fibers, or the corresponding filaments. In a case where the melt adhesiveness is improved by the above-mentioned means such as ① irradiation with high energy rays, ② heat treatment or ③ breakage of molecular chains is induced by free radicals to lower the molecular weight, the tensile strength at break may sometimes decrease. However, by using such reinforced fibers or the like as a filler, it is possible to secure a tensile strength at break of higher than 21 MPa required for the fluororesin as the inner layer. If the tensile strength at break of the fluororesin is at most 21 MPa, the strength of the hose tends to be weak, such being undesirable.

The size of the fuel hose of the present invention is not particularly limited. However, the outer diameter is preferably within a range of from 5 to 30 mm, and the inner diameter is preferably within a range of from 3 to 25 mm. Further, the thickness of each layer constituting the fuel hose is not particularly limited, but it is preferably within a range of from 0.05 to 2.0 mm. For example, a case may be mentioned wherein the outer diameter is 8 mm, the inner diameter is 6 mm and a thickness of 1 mm (the inner layer: 0.2 mm, the outer layer: 0.8 mm).

As a method for forming the fuel hose having a two layer structure of the present invention, there may be mentioned a method wherein cylindrical inner and outer layers are separately formed by extruders, and the outer layer is coated on the inner layer by a heat shrinkable tube, or a method wherein firstly, an inner tube is formed by an inner layer extruder, and on the outer circumference, an outer layer is formed by an outer layer extruder. However, it is most preferred to employ co-extrusion molding wherein a thermoplastic resin to form an outer layer, and an electrically conductive fluororesin to form an inner layer, are subjected to co-extrusion molding in a molten state to have the two heat-fused (melt bonded) to form a hose having a two layer structure in one step.

Usually, it is preferred to preliminarily pelletize the respective resins for the outer and inner layers. For the co-extrusion molding, it is preferred that resin components are mechanically kneaded at a temperature where all resin components will be melted. As such a kneading apparatus, a high temperature kneader or a screw extruder may, for example, be employed. It is particularly preferred to employ a same directional twin screw extruder to mix the electroconductivity-imparting filler to a fluororesin uniformly.

Further, at the time of carrying out extrusion molding, it is preferred to carry out grafting of a grafting compound to ETFE to form an inner layer and lowering of the molecular weight of ETFE by free radicals firstly in an extruder (melt-adhesiveness-imparting step), followed by co-extrusion molding, so that grafting and co-extrusion molding are carried out substantially simultaneously.

The fuel hose of the present invention may be one which has a corrugated region at a midpoint thereof. Such a corrugated region is a region where an optional region in a midpoint of the hose itself is formed into e.g. a waveform shape, a bellows shape, an accordion shape or a corrugated shape.

When the fuel hose of the present invention has such a region where a plurality of corrugated creases are formed in a ring shape, one side of the ring shape can be compressed, while the other side can be stretched outwardly, at such a region, whereby the hose can be easily bent at an optional angle without bringing about a stress fatigue or interlaminar peeling.

The method for forming the corrugated region is not particularly limited. However, it can easily be formed by firstly forming a straight tube, and then subjecting it to molding or the like to form a predetermined corrugated shape.

The fuel hose of the present invention is not limited to one having a corrugated region over the entire length of the hose, but may be one having a corrugated region partly.

In the present invention, various physical properties of the fuel hose (provided that with respect to the tensile strength at break, the physical properties of the resin for the inner layer itself) are measured as follows.

① Adhesive strength (melt adhesive strength):

As a test sample, one obtained by cutting a hose (laminated hose) in a length of 20 cm and further cutting it vertically, is used. From ends of the outer and inner layers, 1 cm is forcibly peeled, and the outer and inner layers are pinched by a small size tensilon as an instrument used, and one of them is pulled at a rate of 100 mm/min. The maximum strength is taken as the adhesive strength (N/cm).

In the present invention, the adhesive strength of the fuel hose is preferably at least 20 (N/cm).

② Electrical conductivity:

Evaluated based on the results of measurement of the volume resistivity. As a test sample, an inner layer obtained by peeling at the time of measuring the adhesive strength in ①, is used. As a measuring instrument, Loresta AP, manufactured by Mitsubishi Chemical Corporation, or the like is employed, and four probes are brought in contact with the sample at 9.8 N, whereby the volume resistivity ($\Omega \cdot cm$) is measured.

In the present invention, the volume resistivity of the inner layer is preferably from about 1 to $10^9$ ($\Omega \cdot cm$).

③ Tensile strength at break:

No. 4' dumbbell formed of the fluororesin of the inner layer is used as a test specimen, and the measurement is carried out in accordance with ASTM D-638. Here, the tensile speed is 200 mm/min.

As described above, in the present invention, it is important that the tensile strength at break at the fluororesin constituting the inner layer, as measured in such a manner, is higher than 21 MPa. This is necessary to secure the strength of the hose, so that the material failure of the inner layer will not occur before interlaminar peeling takes place in the hose having a laminated structure.

④ Gas barrier property:

(a) Gas barrier property of the inner layer

In accordance with JIS Z-0208, it is measured at an exposure temperature of 60° C. The result is represented by the fuel permeation coefficient ($g/m^2 \cdot day$).

In the present invention, for example, when a fuel mixture of isooctane/toluene (volume ratio of 1:1) is used as a test fuel, a preferred fuel permeation coefficient is less than 6 ($g/m^2 \cdot day$).

(b) Gas barrier property as a laminated hose

As a test sample, a two layer laminated hose is cut into a length of 10 cm and dried at 110° C. for two hours, whereupon the weight is measured. Then, a fuel is sealed in, and both ends are closed.

This sample is set in a thermostatic oven at 60° C. Upon expiration of 24 hours, the hose is taken out and cooled to room temperature, whereupon the weight is measured. The change in weight, is divided by the inner layer surface area and 24 hours. The gas barrier property is represented by the fuel permeability coefficient ($g/m^2 \cdot day$) obtained by dividing the change in weight by the inner layer surface area and 24 hours.

In the present invention, in the case of a test fuel which is the same as used in (a), a preferred fuel permeation coefficient is less than 6 ($g/m^2 \cdot day$).

Further, in order to adequately secure the barrier property, the thickness of the inner layer is preferably at least 0.1 mm.

Now, the present invention will be described in detail with reference to Preparation Examples and Working Examples. However, it should be understood that the present invention is by no means restricted by such specific Examples.

(1) Firstly, ETFE and its pellets, to form the inner layer of a hose, were prepared.

REFERENCE EXAMPLE 1

Resin A

By suspension polymerization, ETFE (polymerized units based on ethylene/polymerized units based on tetrafluoroethylene/polymerized units based on (perfluorobutyl)ethylene=58/40.5/1.5 (molar ratio), hereinafter referred to as resin A) was produced. MFR of resin A was measured and found to be 33 (g/10 min). Further, no absorption peak was observed within a rage of wavenumber of from 1720 to 1800 $cm^{-1}$.

REFERENCE EXAMPLE 2

Resin B

By changing the charging ratio of a chain transfer agent, in the same manner as in Reference Example 1, ETFE (polymerized units based on ethylene/polymerized units based on tetrafluoroethylene/polymerized units based on (perfluorobutyl)ethylene=58/38/4 (molar ratio), hereinafter referred to as resin B) was produced. MFR of resin B was measured and found to be 70 (g/10 min), and it had melt adhesiveness. Further, no absorption peak was observed within a rage of wavenumber of from 1720 to 1800 cm$^{-1}$.

REFERENCE EXAMPLE 3

Pellets 1

100 Parts by mass of resin A prepared in Reference Example 1, 1.5 parts by mass of maleic anhydride and 0.2 part by mass of t-butyl hydroperoxide, were supplied to a same directional twin screw extruder and kneaded by adjusting the melting zone of the cylinder to 300° C. The discharged strand was cooled with water, and the strand was cut by a pelletizer to obtain pellets 1 having melt adhesiveness. The pellets 1 were dried for 10 hours in an electric oven of 120° C. to remove the water content.

MFR of pellets 1 was measured and found to be 30 (g/10 min).

REFERENCE EXAMPLE 4

Pellets 2

100 Parts by mass of resin A prepared in Reference Example 1, 1.5 parts by mass of maleic anhydride, 0.2 part by mass of t-butyl hydroperoxide and 11 parts by mass of carbon black (manufactured by Denki Kagaku Kogyo K.K.), were supplied to a same directional twin screw extruder and kneaded by adjusting the melting zone of the cylinder to 300° C. The discharged strand was cooled with water, and the strand was cut by a pelletizer to obtain pellets 2 having melt adhesiveness. The pellets 2 were dried for 10 hours in an electric oven of 120° C. to remove the water content.

MFR of pellets 2 was measured and found to be 6 (g/10 min).

REFERENCE EXAMPLE 5

Pellets 3

100 Parts by mass of resin B prepared in Reference Example 2 and 11 parts by mass of carbon black (manufactured by Denki Kagaku Kogyo K.K.), were supplied to a same directional twin screw extruder and kneaded by adjusting the melting zone of the cylinder to 280° C. to obtain pellets 3 having melt adhesiveness and electrical conductivity. The pellets 3 were dried for 10 hours in an electric oven of 120° C. to remove the water content.

MFR of pellets 3 was measured and found to be 25 (g/10 min).

REFERENCE EXAMPLE 6

Pellets 4

100 Parts by mass of resin A prepared in Reference Example 1, was subjected to heat treatment for 60 minutes in an oven of 350° C. Then, 100 parts by mass of this heat treated product and 11 parts by mass of carbon black (manufactured by Denki Kagaku Kogyo K.K.), were supplied to a same directional twin screw extruder and kneaded at 300° C. by adjusting the melting zone of the cylinder to 300° C. The discharged strand was cooled with water, and the strand was cut by a pelletizer to obtain pellets 4 having melt adhesiveness and electrical conductivity. The pellets 4 were dried for 10 hours in an electric oven of 120° C. to remove the water content. With pellets 4, absorbance of 0.058 was observed at a wavenumber of 1759 cm$^{-1}$, and absorbance of 0.008 was measured at a wavenumber of 1788 cm$^{-1}$.

MFR of pellets 4 was measured and found to be 23 (g/10 min)

(2) In the following Examples 1 to 5 and Comparative Examples 1 and 2, hoses were formed by using the above resin or pellets.

EXAMPLE 1

To a cylinder to form an outer layer of a hose, polyamide 12 (5016XHP, manufactured by Toray Corporation) was supplied. Further, to a cylinder to form an inner layer, a mixture comprising 100 parts by mass of a powder of resin A, 1.5 parts by mass of maleic anhydride, 0.2 part by mass of t-butyl hydroperoxide and 13 parts by mass of carbon black (manufactured by Denki Kagaku Kogyo K.K.), was supplied, to form resin C having melt adhesiveness at a temperature of the melting zone of the cylinder of 260° C. for a retention time of three minutes, and resin C was transferred to a transport zone of the cylinder.

A laminated hose having an outer diameter of 8 mm and an inner diameter of 6 mm was formed by two layer co extrusion at a co-extrusion die temperature of 250° C. for polyamide 12 and resin C at a withdrawing speed of 10 m/min.

The adhesive strength (melt adhesive strength) of the outer and inner layers was measured and found to be 60 N/cm. Further, after immersing the laminated hose in a fuel oil for 120 hours at 60° C., the adhesive strength of the outer and inner layers was measured and found to be 58 N/cm.

Further, the volume resistivity of the inner layer was measured and found to be $10^3$ (Ω·cm).

The gas barrier property (g/m$^2$·day) was (a) 1.2, and (b)<0.001.

Further, the tensile strength at break of resin C of the inner layer was 29 MPa.

EXAMPLE 2

To a cylinder to form an outer layer of a hose, polyamide 12 (5016XHP, manufactured by Toray Corporation) was supplied. Further, to a cylinder to form an inner layer, pellets 2 having melt adhesiveness, prepared in Reference Example 4, were supplied, to form resin D at a melting zone temperature of cylinder of 260° C. for a retention time of three minutes, and resin D was transferred to a transport zone of the cylinder.

A laminated hose having an outer diameter of 8 mm and an inner diameter of 6 mm was formed by two layer co extrusion at a co-extrusion die temperature of 250° C. for polyamide 12 and resin D at a withdrawing speed of 10 m/min.

The adhesive strength (melt adhesive strength) of the outer and inner layers was measured and found to be 66 N/cm. Further, after immersing the laminated hose in a fuel oil for 120 hours at 60° C., the adhesive strength of the outer and inner layers was measured and found to be 65 N/cm.

Further, the volume resistivity of the inner layer was measured and found to be $10^2$ (Ω·cm).

The gas barrier property (g/m$^2$·day) was (a) 1.1, and (b)<0.001.

Further, the tensile strength at break of resin D of the inner layer was 28 MPa.

EXAMPLE 3

To a cylinder to form an outer layer of a hose, polyamide 12 (5016XHP, manufactured by Toray Corporation) was supplied. Further, to a cylinder to form an inner layer, pellets 3 prepared in Reference Example 5, were supplied, to form resin E at a melting zone temperature of cylinder of 260° C. for a retention time of three minutes, and resin E was transferred to a transport zone of the cylinder.

A laminated hose having an outer diameter of 8 mm and an inner diameter of 6 mm was formed by two layer co extrusion at a co-extrusion die temperature of 250° C. for polyamide 12 and resin E at a withdrawing speed of 10 m/min.

The adhesive strength (melt adhesive strength) of the outer and inner layers was measured and found to be 62 N/cm. Further, after immersing the laminated hose in a fuel oil for 120 hours at 60° C., the adhesive strength of the outer and inner layers was measured and found to be 60 N/cm.

Further, the volume resistivity of the inner layer was measured and found to be $10^2$ ($\Omega \cdot cm$).

The gas barrier property (g/m$^2$·day) was (a) 1.0, and (b)<0.001.

Further, the tensile strength at break of resin E of the inner layer was 25 MPa.

EXAMPLE 4

To a cylinder to form an outer layer of a hose, polyamide 12 (5016XHP, manufactured by Toray Corporation) was supplied. Further, to a cylinder to form an inner layer, pellets 4 prepared in Reference Example 6, were supplied, to form resin F at a melting zone temperature of cylinder of 260° C. for a retention time of three minutes, and resin F was transferred to a transport zone of the cylinder.

A laminated hose having an outer diameter of 8 mm and an inner diameter of 6 mm was formed by two layer co extrusion at a co-extrusion die temperature of 250° C. for polyamide 12 and resin F at a withdrawing speed of 10 m/min.

The adhesive strength (melt adhesive strength) of the outer and inner layers was measured and found to be 66 N/cm. Further, after immersing the laminated hose in a fuel oil for 120 hours at 60° C., the adhesive strength of the outer and inner layers was measured and found to be 60 N/cm.

Further, the volume resistivity of the inner layer was measured and found to be $10^2$ ($\Omega \cdot cm$).

The gas barrier property (g/m$^2$·day) was (a) 1.0, and (b)<0.001.

Further, the tensile strength at break of resin F of the inner layer was 25 MPa.

EXAMPLE 5

Using four laminated hoses which were the same as in Examples 1 to 4, four hoses having corrugated regions over the entire hoses, were prepared by a molding method.

Each of these hoses was a corrugated laminated hose having an outer diameter of 11 mm and an inner diameter of 9.4 mm at thick portions of the corrugated region and an outer diameter of 8 mm and an inner diameter of 6 mm at thin portions. With respect to these corrugated laminated hoses, the adhesive strength of the outer and inner layers, the volume resistivity of the inner layer and the tensile strength at break of the resin of the inner layer, were confirmed to be the same as of the laminated hoses of Examples 1 to 4. Further, these corrugated laminated hoses can be mounted as bent at an optional angle depending upon the structural configuration in an engine room.

COMPARATIVE EXAMPLE 1

To a cylinder to form an outer layer of a hose, polyamide 12 (5016XHP, manufactured by Toray Corporation) was supplied. Further, to a cylinder to form an inner layer, a mixture comprising 100 parts by mass of ETFE (Aflon LM730AP, manufactured by Asahi Glass Company, Limited) and 13 parts by mass of carbon black (manufactured by Denki Kagaku Kogyo K.K.) was supplied, to form resin G at a melting zone temperature of cylinder of 260° C. for a retention time of three minutes, and resin G was transferred to a transport zone of the cylinder.

A laminated hose having an outer diameter of 8 mm and an inner diameter of 6 mm was formed by two layer co extrusion at a co-extrusion die temperature of 250° C. for polyamide 12 and resin G at a withdrawing speed of 10 m/min.

The adhesive strength (melt adhesive strength) of the outer and inner layers was measured and found to be 7 N/cm, and the melt adhesiveness was very small. Further, the volume resistivity of the inner layer was measured and found to be $10^4$ ($\Omega \cdot cm$).

The gas barrier property (g/m$^2$·day) was (a) 1.1, and (b)<0.001.

Further, the tensile strength at break of resin G of the inner layer was 30 MPa.

COMPARATIVE EXAMPLE 2

To a cylinder to form an outer layer of a hose, polyamide 12 (5016XHP, manufactured by Toray Corporation) was supplied. Further, to a cylinder to form an inner layer, pellets 1 were supplied to form resin H at a melting zone temperature of cylinder of 260° C. for a retention time of three minutes, and resin H was transferred to a transport zone of the cylinder.

A laminated hose having an outer diameter of 8 mm and an inner diameter of 6 mm was formed by two layer co extrusion at a co-extrusion die temperature of 250° C. for polyamide 12 and resin H at a withdrawing speed of 10 m/min.

The adhesive strength (melt adhesive strength) of the outer and inner layers was measured and found to be 60 N/cm. Further, the volume resistivity of the inner layer was measured and found to be at least $10^{16}$ ($\Omega \cdot cm$), and the electrical conductivity was very small.

The gas barrier property (g/m$^2$·day) was (a) 1.1, and (b)<0.01.

Further, the tensile strength at break of resin H of the inner layer was 32 MPa.

INDUSTRIAL APPLICABILITY

The fuel hose of the present invention is a fuel hose having a two layer structure comprising an inner layer made of a fluororesin and an outer layer adjacent thereto, made of a thermoplastic resin other than a fluororesin, wherein the fluororesin of the inner layer has melt adhesiveness with the thermoplastic resin of the outer layer and further has chemical resistance and electrical conductivity, and further, the tensile strength at break is sufficiently high. Accordingly, the fuel hose of the present invention is excellent in interlaminar adhesive force without using an adhesive and further has a sufficient strength as a hose and a sufficient antistatic function.

Furthermore, the fuel hose of the present invention preferably has a corrugated region and can be mounted as bent at an optional angle depending upon the structural configuration in an engine room without necessity of bending processing and without stress fatigue or interlaminar peeling. Further, even when a corrugated region is formed, the interlaminar adhesive strength, the strength as a hose and the antistatic function will not be impaired.

The entire disclosure of Japanese Patent Application No. 11-277821 filed on Sep. 30, 1999 including specification, claims and summary are incorporated herein by reference in its entirety.

What is claimed is:

1. A hose having a two layer structure comprising an inner layer comprising a fluororesin and an outer layer disposed thereon, comprising a thermoplastic resin other than the fluororesin, wherein the fluororesin is an ethylene/tetrafluoroethylene copolymer having a melt flow rate of more than 40 and an infrared absorbance of at least 0.002 between 1720 to 1800 cm$^{-1}$ and the fluororesin is prepared by a method selected from the group consisting of irradiating an ethylene/tetrafluoroethylene copolymer having a melt flow rate of less than 40 with high energy rays, heat treating an ethylene/tetrafluoroethylene copolymer having a melt flow rate of less than 40 at a temperature of 330 to 400° C. for 5 to 30 minutes, and melt kneading a mixture consisting essentially of an ethylene/tetrafluoroethylene copolymer having a melt flow rate of less than 40 and a peroxide at a temperature higher than the decomposition temperature of the peroxide, and the fluororesin has melt adhesiveness with the thermoplastic resin of the outer layer.

2. The hose according to claim 1, which has a corrugated region at a midpoint thereof.

3. The hose according to claim 1, wherein the inner layer and outer layer are bonded by melt adhesion.

4. The hose according to claim 1, wherein the thermoplastic resin of the outer layer is polyamide 6, polyamide 11 or polyamide 12.

5. The hose according to claim 1, wherein the volume resistivity of the inner layer is from 1 to $10^9$ Ω·cm.

6. The hose according to claim 1, wherein the inner layer contains an electrical conductivity-imparting filler.

7. The hose of claim 6, wherein the electrical conductivity-imparting filler is carbon black.

8. The hose according to claim 1, wherein the inner and outer layer are formed by co-extrusion molding.

9. The hose of claim 1, wherein the ethylene/tetrafluoroethylene copolymer is tetrafluoroethylene/ethylene/other copolymerizable monomer copolymerized in a molar ratio of 60-30/20-60/0-40.

10. The hose of claim 9, wherein the other copolymerizable monomer is an α-olefin, a fluoroolefin, a vinyl ether, an acrylate or a methacrylate.

11. The hose according to claim 9, wherein said ratio is 60-40/35-50/0-5.

12. The hose according to claim 1, which has an adhesive strength of at least 20 N/cm.

13. The hose according to claim 1, having a fuel permeating coefficient of less than 6 g/m$^2$·day.

14. The hose according to claim 1, wherein said inner layer has a thickness of at least 0.1 mm.

15. The hose of claim 1, having an outer diameter of from 5 to 30 mm, and an inner diameter of from 3 to 25 mm.

16. The hose of claim 1, having a corrugated region over an entire length thereof.

17. A method of piping fuel, which comprises piping said fuel through the hose of claim 1.

18. The method of claim 17, wherein said fuel is a gasoline fuel containing an alcohol or an aromatic compound.

* * * * *